US012374486B2

(12) United States Patent
Sato et al.

(10) Patent No.: US 12,374,486 B2
(45) Date of Patent: Jul. 29, 2025

(54) MAGNETIC COUPLING COIL ELEMENT

(71) Applicant: TAIYO YUDEN CO., LTD., Tokyo (JP)

(72) Inventors: Natsuko Sato, Tokyo (JP); Tomoo Kashiwa, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 18/451,635

(22) Filed: Aug. 17, 2023

(65) Prior Publication Data

US 2023/0395303 A1 Dec. 7, 2023

Related U.S. Application Data

(63) Continuation of application No. 16/516,616, filed on Jul. 19, 2019, now Pat. No. 11,776,734.

(30) Foreign Application Priority Data

Jul. 31, 2018 (JP) ................................ 2018-143889

(51) Int. Cl.
*H01F 27/28* (2006.01)
*H01F 5/00* (2006.01)
*H01F 17/00* (2006.01)
(Continued)

(52) U.S. Cl.
CPC ......... *H01F 27/2804* (2013.01); *H01F 5/003* (2013.01); *H01F 17/0013* (2013.01);
(Continued)

(58) Field of Classification Search
CPC ......... H01F 27/2804; H01F 2027/2809; H01F 17/0013; H01F 17/0006; H01F 5/003;
(Continued)

(56) References Cited

U.S. PATENT DOCUMENTS 6,198,374 B1 3/2001 Abel
2007/0057755 A1* 3/2007 Suzuki ................ H01F 17/0013 336/200
(Continued)

FOREIGN PATENT DOCUMENTS

JP 2016-131208 A 7/2016
WO 2005/031764 A1 4/2005
(Continued)

OTHER PUBLICATIONS

Request for Submission of an Opinion dated Feb. 6, 2024, issued in corresponding Korean Patent Application No. 10-2019-0074743 with English translation (8 pgs.).
First Office Action dated Nov. 8, 2023, issued in corresponding Chinese Patent Application No. 201910654602.1 with English translation (16 pgs.).
Notice of Reasons for Refusal dated Jan. 4, 2022, issued in corresponding Japanese Patent Application No. 2018-143998, with English translation (11 pgs.).

*Primary Examiner* — Tszfung J Chan
(74) *Attorney, Agent, or Firm* — Pillsbury Winthrop Shaw Pittman, LLP

(57) ABSTRACT

A coil element according to one embodiment includes: an insulator body including first insulating layers and second insulating layers laminated in a stacking direction; first conductive patterns formed on the first insulating layers; second conductive patterns formed on the second insulating layers; a first to fourth external electrodes each provided on a bottom surface of the insulator body; and a first to fourth lead via conductive member. The insulator body includes a first portion and a second portion. The electrical resistivity of the first portion is higher than that of the second portion. The first portion covers upper and lower surfaces of at least one of intermediate first conductive patterns in the intermediate region. The first lead via conductive member, the second lead via conductive member, the third lead via conductive member, and the first lead via conductive member are arranged outside the first portion.

7 Claims, 8 Drawing Sheets

(51) Int. Cl.
*H01F 17/04* (2006.01)
*H01F 27/29* (2006.01)

(52) U.S. Cl.
CPC ......... *H01F 17/04* (2013.01); *H01F 27/2823* (2013.01); *H01F 27/29* (2013.01); *H01F 2017/0066* (2013.01); *H01F 2027/2809* (2013.01)

(58) Field of Classification Search
CPC ............. H01F 2017/0093; H01F 27/29; H01F 27/292; H01F 2017/0066; H01F 17/04; H01F 27/2823
USPC .................................................. 336/200, 232
See application file for complete search history.

(56) References Cited

U.S. PATENT DOCUMENTS

| | | | | |
|---|---|---|---|---|
| 2015/0332840 | A1 | 11/2015 | Yazaki | |
| 2016/0133374 | A1* | 5/2016 | Inui | H01F 27/292 336/192 |
| 2016/0372254 | A1* | 12/2016 | Harada | H01F 27/2804 |
| 2018/0254139 | A1 | 9/2018 | Yazaki | |

FOREIGN PATENT DOCUMENTS

| | | | |
|---|---|---|---|
| WO | 2014/136342 | A1 | 9/2014 |
| WO | 2017/110952 | A1 | 6/2017 |

* cited by examiner

MAGNETIC COUPLING COIL ELEMENT

CROSS-REFERENCE TO RELATED APPLICATIONS

This application is a continuation of U.S. patent application Ser. No. 16/516,616 (filed on Jul. 19, 2019), which claims the benefit of priority from Japanese Patent Application Serial No. 2018-143889 (filed on Jul. 31, 2018), the contents of which are hereby incorporated by reference in their entirety.

TECHNICAL FIELD

The present invention relates to a coil element, and in particular to a magnetic coupling coil element including a pair of coil conductors magnetically coupled to each other. In further particular, the present invention relates to a magnetic coupling coil element produced by a lamination process.

BACKGROUND

A magnetic coupling coil element includes a pair of coil conductors magnetically coupled to each other. Examples of magnetic coupling coil element including a pair of coil conductors magnetically coupled to each other include a common mode choke coil, a transformer, and a coupling inductor. In most cases, such a magnetic coupling coil element preferably has a high coupling coefficient between the pair of coil conductors.

Magnetic coupling coil elements produced by a lamination process are disclosed in Japanese Patent Application Publication No. 2016-131208 ("the '208 Publication") and International Publication No. WO 2014/136342 ("the '342 Publication").

The coupling coil element disclosed in the '208 Publication includes a plurality of coil units embedded in an insulator. The plurality of coil units are configured such that the winding axes of the coil conductors of the coil units are substantially aligned with each other and the coil units are tightly contacted with each other, thereby increasing the degree of coupling between the coil conductors.

In the magnetic coupling coil element disclosed in the '208 Publication, a leakage magnetic flux passing between the two coil conductors causes a leakage inductance. The leakage inductance degrades the coupling coefficient in the magnetic coupling coil element.

In the coupling coil element disclosed in the '342 Publication, a coil conductor of a first line extends across a plurality of insulating layers, and a coil conductor of a second line extends across a plurality of insulating layers other than those across which the coil conductor of the first line extends. In this coupling coil element, the layers of the coil conductor of the first line and the layers of the coil conductor of the second line are arranged alternately along the stacking direction, thereby increasing the degree of coupling between the two lines.

In the coupling coil element disclosed in the '342 Publication, the coil conductors of different lines are separated by only the thickness of one insulating layer. Depending on the directions of the electric current flowing through the coil conductors of both lines, the potential difference is large between the coil conductors arranged on adjacent insulating layers. Therefore, it is difficult to ensure insulation between coil conductors of different lines.

SUMMARY

One object of the present invention is to improve magnetic coupling coil elements.

One particular object of the present invention is to provide a magnetic coupling coil element having a high coupling coefficient between coils of different lines and a highly reliable insulation between the coils.

Other objects of the present invention will be apparent with reference to the entire description in this specification.

A coil element according to one embodiment of the present invention comprises: an insulator body including a plurality of first insulating layers and a plurality of second insulating layers laminated in a stacking direction; a plurality of first conductive patterns formed on the plurality of first insulating layers; and a plurality of second conductive patterns formed on the plurality of second insulating layers. In the coil element according to the embodiment, the insulator body includes a first end region situated at a top in the stacking direction, a second end region situated at a bottom in the stacking direction, and an intermediate region situated between the first end region and the second end region. The first end region includes one or more of the plurality of first insulating layers only, and the second end region includes one or more of the plurality of second insulating layers only. The intermediate region includes other one or more of the plurality of first insulating layers and other one or more of the plurality of second insulating layers arranged alternately in the stacking direction. The insulator body of the coil element includes a first portion and a second portion that is an area other than the first portion, the first portion covering upper and lower surfaces of at least one of one or more intermediate first conductive patterns in the intermediate region among the plurality of first conductive patterns. The electrical resistivity of the first portion is higher than the electrical resistivity of the second portion.

The above description that the first end region includes the first insulating layers "only" means that the first end region includes insulating layers included in the plurality of first insulating layers but does not include insulating layers included in the plurality of second insulating layers. In other words, insulating layers included in the plurality of second insulating layers are not provided in the first end region. As a result, the first end region also does not include the plurality conductive patterns formed on the plurality of second insulating layers. As for members other than the insulating layers, the first end region may include any members other than the first insulating layers. For example, the first end region may include the first conductive patterns formed on the first insulating layers and via electrodes connecting the first conductive patterns to each other.

The above description that the second end region includes the second insulating layers "only" is also focused on the insulating layers, as described for the first end region. That is, the above description that the second end region includes "only" the second insulating layers means that the second end region includes insulating layers included in the plurality of second insulating layers but does not include insulating layers included in the plurality of first insulating layers.

In this embodiment, the first end region includes the first conductive patterns but does not include the second conductive patterns, and the second end region includes the second conductive patterns but does not include the first conductive patterns. The potential difference between the conductive patterns of the same line provided on adjacent insulating layers (that is, the potential difference between the first conductive patterns and the potential difference between the second conductive patterns) is usually not so large as to cause dielectric breakdown, and therefore, the first end region and the second end region are hardly subject to dielectric breakdown.

In the intermediate region, adjacent insulating layers have formed thereon conductive patterns of different lines. Therefore, it is desirable to improve the insulation quality between the adjacent insulating layers. For example, the thickness of the insulating layers included in the intermediate region can be increased to improve the insulation quality between adjacent conductive patterns included in the intermediate region. According to the above embodiment, when the insulating layers are thickened to improve the insulation quality, it is only required to increase the thickness of the insulating layers included in the intermediate region. This preserves a low profile as compared to the case where the whole insulating layers are thickened.

In the above embodiment, the intermediate region includes the first insulating layers and the second insulating layers arranged alternately in the stacking direction. Thus, in the intermediate region, the first conductive patters and the second conductive patterns are disposed on adjacent insulating layers. Therefore, the coupling coefficient between the coil including the first conductive patterns and the coil including the second conductive patterns can be increased.

In the above embodiment, the upper and lower surfaces of at least one of the one ore more intermediate first conductive patters provided in the intermediate region are covered by the first portion that has a high electrical resistivity. Therefore it is possible to further improve the insulation reliability.

the first portion is further provided to cover upper and lower surfaces of at least one of the one or more intermediate second conductive patterns in the intermediate region among the plurality of second conductive patterns.

According to the above embodiment, it is possible to prevent insulation breakdown caused by a high electric potential at the intermediate second conductive pattern, therefore insulation reliability can be further improved.

The coil element in one embroilment may further include a first external electrode electrically connected to a first end portion of a first coil unit that includes the plurality of first conductive patterns, and a second external electrode electrically connected to a second end portion of the first coil unit. The plurality of first conductive patterns includes a first edge conductive pattern disposed closest to the first external electrode and a second edge conductive pattern disposed closest to the second external electrode. The first edge conductive pattern is included in the one or more intermediate first conductive patterns, and the first portion is provided such that it covers upper and lower surfaces of the first edge conductive pattern.

According to the above embodiment, the upper and lower surfaces of the first edge conductive pattern having a high electric potential as it is disposed close to the first external electrode are covered by the first portion. Therefore it is possible to improve the insulation reliability.

The coil element in one embroilment may further include a third external electrode electrically connected to a first end portion of a second coil unit that includes the plurality of second conductive patterns, and a fourth external electrode electrically connected to a second end portion of the second coil unit. The plurality of second conductive patterns may include a third edge conductive pattern disposed closest to the third external electrode and a fourth edge conductive pattern disposed closest to the fourth external electrode. The fourth edge conductive patten may be included in the one or more intermediate first conductive patterns, and the first portion may be provided such that it covers upper and lower surfaces of the fourth edge conductive pattern.

According to the above embodiment, the upper and lower surfaces of the fourth edge conductive pattern having a high electric potential as it is disposed close to the fourth external electrode are covered by the first portion. Therefore it is possible to improve the insulation reliability.

In the coil element according to one embroilment, the first external electrode, the second external electrode, the third external electrode, and the fourth external electrode may be all provided on a bottom surface of the insulator body. The first external electrode and the first edge conductive pattern may be connected by a first lead via conductive member, the second external electrode and the second edge conductive pattern may be connected by a second lead via conductive member, the third external electrode and the first edge conductive pattern may be connected by a third lead via conductive member, and the fourth external electrode and the first edge conductive pattern may be connected by a fourth lead via conductive member. The first portion may be provided to be interposed between the first lead via conductive member and the plurality of second conductive patterns, between the second lead via conductive member and the plurality of second conductive patterns, and between the fourth lead via conductive member and the plurality of first conductive patterns.

According to the above-described embodiment, since all the four external electrodes are provided on the bottom surface of the insulator body, the coil element can be miniaturized in the length direction. Moreover, the first portion is provided such that it is interposed between the first lead via conductive member and the plurality of second conductive patterns, between the second lead via conductive member and the plurality of second conductive patterns, and between the fourth lead via conductive member and the plurality of first conductive patterns. Therefore it is possible to prevent dielectric breakdown caused by any of the lead via conductive members.

The coil element according to one embodiment further includes one or more first connection via conductive members connecting the plurality of first conductive patterns to each other; and one or more second connection via conductive members connecting the plurality of second conductive patterns to each other.

Various embodiments of the invention disclosed herein provide a magnetic coupling coil element having a high coupling coefficient between coils of different lines and a highly reliable insulation between the coils.

DESCRIPTION OF THE EMBODIMENTS

With reference to the appended drawings, the following describes various embodiments of the present invention. Constituent elements common to a plurality of drawings are denoted by the same reference signs throughout the plurality of drawings. It should be noted that the drawings do not necessarily appear to an accurate scale for the sake of convenience of explanation.

Figure 1:
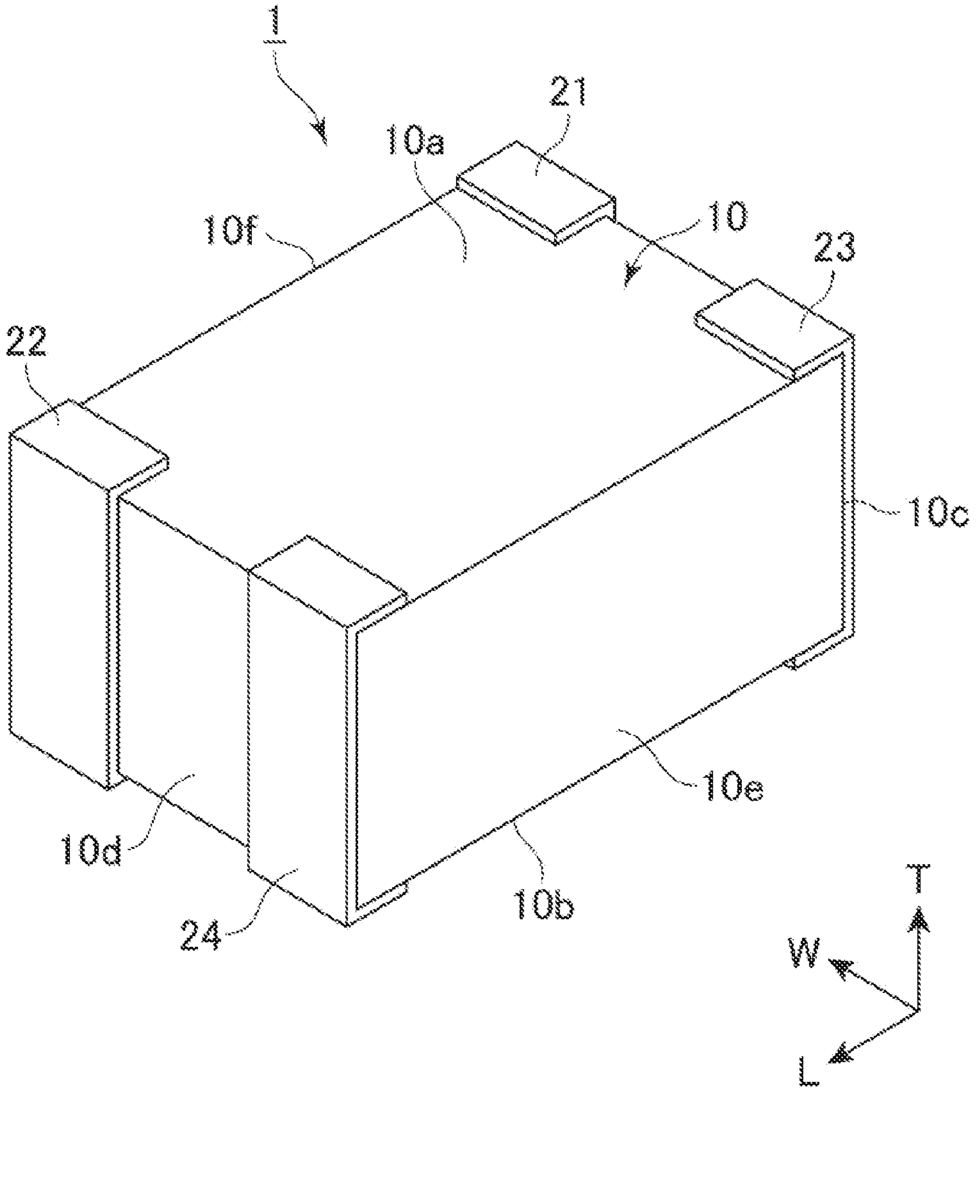
FIG. 1 is a perspective view of a coil element according to one embodiment of the invention.
Figure 2:
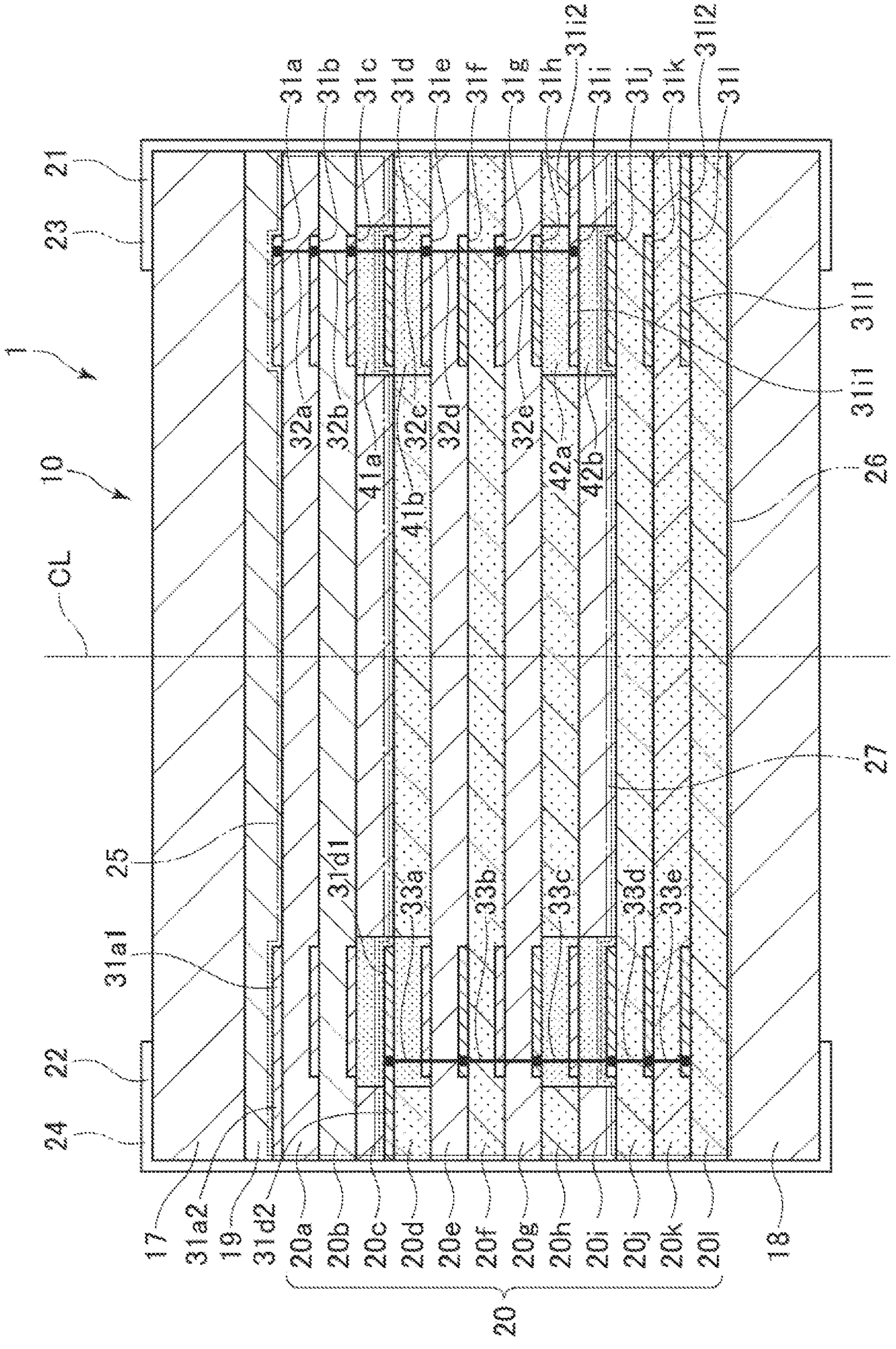
FIG. 2 is a schematic perspective view of the interior of the coil element of FIG. 1 as viewed from the front.
Figure 3A:
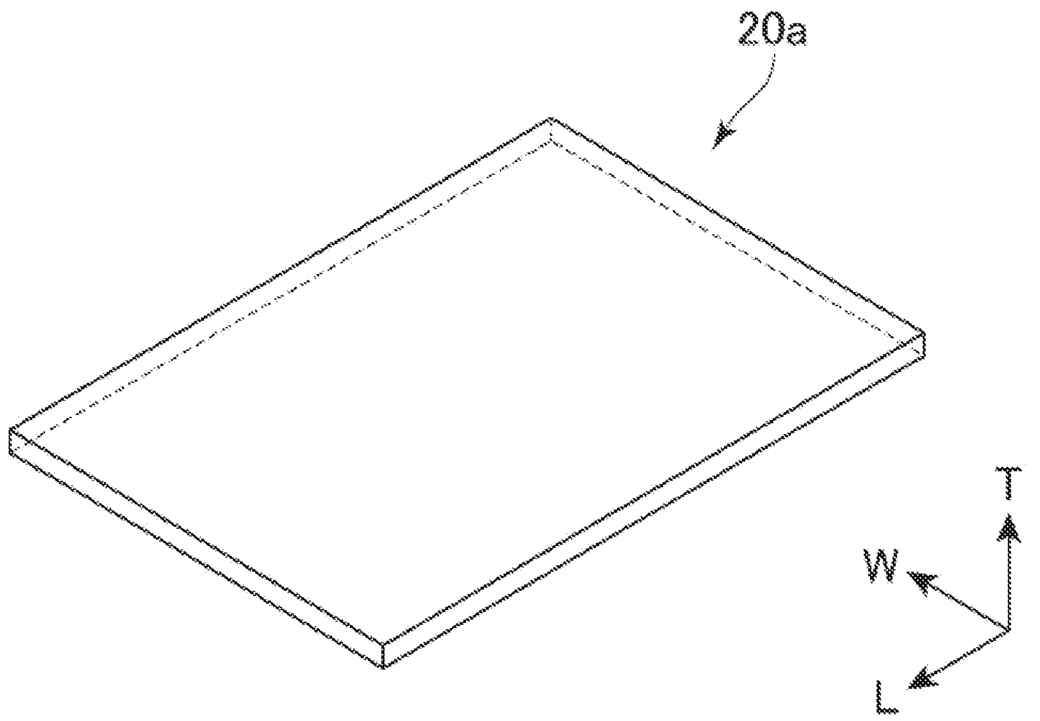
FIG. 3*a* is a perspective view for schematically showing an insulating layer in the coil element shown in FIG. 1.
Figure 3B:
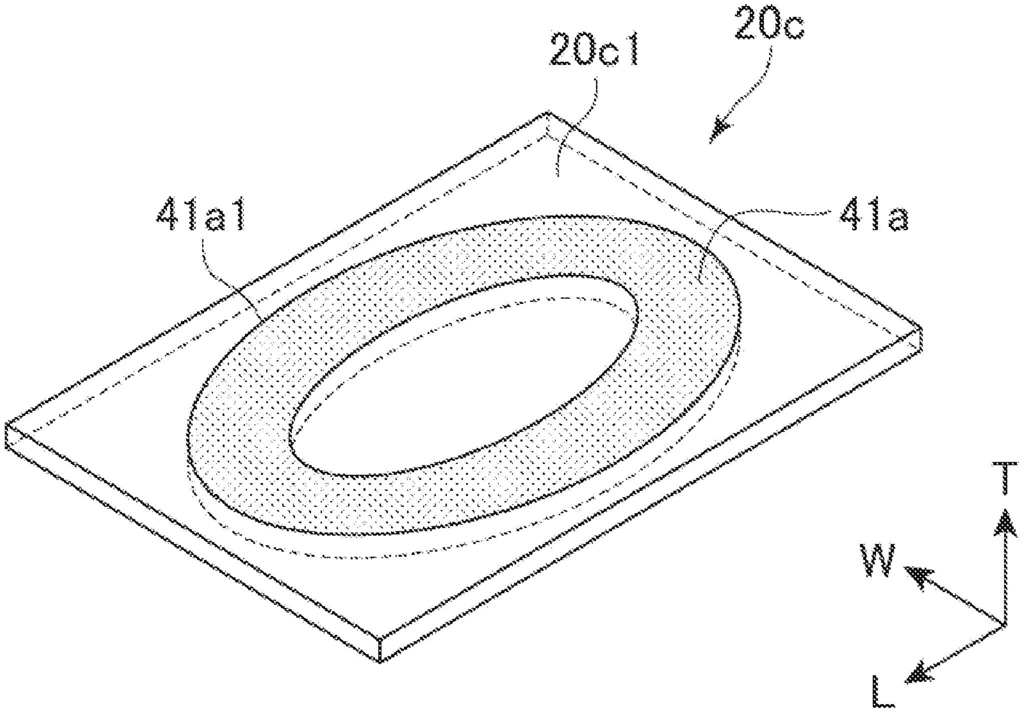
FIG. 3*b* is a perspective view for schematically showing an insulating layer in the coil element shown in FIG. 1.

A coil element 1 according to one embodiment of the present invention will be hereinafter described with reference to FIGS. 1 to 3*b*. FIG. 1 is a perspective view of the coil element 1 according to one embodiment of the present invention, and FIG. 2 is a schematic perspective view of the interior of the coil element of FIG. 1 as viewed from the front. FIGS. 3*a* and 3*b* are perspective views for schematically showing an insulating layer in the coil element 1.

The coil element 1 shown in these drawings is a multi-layered magnetic coupling coil element produced through a lamination process, a thin film process or any other process. The coil element 1 may be used as a transformer, a coupling inductor, or other various coil elements, in addition to a common mode choke coil.

The coil element 1 includes an insulator body 10 made of a magnetic material having an excellent insulation property, a first coil unit embedded in the insulator body 10, a second coil unit embedded in the insulator body 10, an external electrode 21 electrically connected to one end of the first coil unit, an external electrode 22 electrically connected to the other end of the first coil unit, an external electrode 23 electrically connected to one end of the second coil unit, and an external electrode 24 electrically connected to the other end of the second coil unit. The first coil unit and the second coil unit will be described later. The external electrode 21 is an example of a first external electrode, the external electrode 22 is an example of a second external electrode, the external electrode 23 is an example of a third external electrode, and the external electrode 24 is an example of a fourth external electrode.

The insulator body 10 has a substantially rectangular parallelepiped shape. The insulator body 10 has a first principal surface 10*a*, a second principal surface 10*b*, a first end surface 10*c*, a second end surface 10*d*, a first side surface 10*e*, and a second side surface 10*f*. The outer surface of the insulator body 10 is defined by these six surfaces. The first principal surface 10*a* and the second principal surface 10*b* are opposed to each other, the first end surface 10*c* and the second end surface 10*d* are opposed to each other, and the first side surface 10*e* and the second side surface 10*f* are opposed to each other.

In FIG. 1, the first principal surface 10*a* lies on the top side of the insulator body 10, and therefore, the first principal surface 10*a* may be herein referred to as "the top surface." Similarly, the second principal surface 10*b* may be referred to as "the bottom surface." The coil component 1 is disposed such that the second principal surface 10*b* faces a circuit board (not shown), and therefore, the second principal surface 10*b* may be herein referred to as "the mounting surface." Furthermore, a top-bottom direction of the coil component 1 is based on a top-bottom direction in FIG. 1.

For convenience in description, the first side surface 10*e* is supposed to be the front surface of the coil element 1. FIG. 2 schematically shows the interior of the coil element 1 as viewed from the first side surface 10*e* of the coil element 1.

In this specification, a "length" direction, a "width" direction, and a "thickness" direction of the coil component 1 are referred to as an "L" axis direction, a "W" axis direction, and a "T" axis direction in FIG. 1, respectively, unless otherwise construed from the context.

The external electrode 21 and the external electrode 23 are provided on the first end surface 10*c* of the insulator body 10. The external electrode 22 and the external electrode 24 are provided on the second end surface 10*d* of the insulator body 10. As shown, these external electrodes extend to the top surface 10*a* and the bottom surface 10*b* of the insulator body 10.

As shown in FIG. 2, the insulator body 10 includes an insulator portion 20, a top cover layer 17 provided on the upper surface of the insulator portion 20, and a bottom cover layer 18 provided on the lower surface of the insulator portion 20.

The insulator portion 20 includes insulating layers 20*a* to 20*l*. The insulator portion 20 includes the insulating layer 20*a*, the insulating layer 20*b*, the insulating layer 20*c*, the insulating layer 20*d*, the insulating layer 20*e*, the insulating layer 20*f*, the insulating layer 20*g*, the insulating layer 20*h*, the insulating layer 20*i*, the insulating layer 20*j*, the insulating layer 20*k*, and the insulating layer 20*l* that are stacked together in this order from the positive side to the negative side with respect to the direction of the axis T.

In one embodiment of the present invention, the insulating layer 19 and the insulating layers 20*a* to 20*l* contain a resin and a large number of filler particles. The filler particles are dispersed in the resin. The insulating layers 20*a* to 20*l* may not contain the filler particles.

The top cover layer 17 is a laminate including a plurality of insulating layers stacked together. Similarly, the bottom cover layer 18 is a laminate including a plurality of insulating layers stacked together. Each of the insulating layers constituting the top cover layer 17 and the bottom cover layer 18 is made of a resin containing a large number of filler particles dispersed therein. These insulating layers may not contain the filler particles.

The insulating layer 19, the insulating layers 20*a* to 20*l*, the insulating layers constituting the top cover layer 17, and the insulating layers constituting the bottom cover layer 18 are formed of a magnetic material having a fine insulation property. The insulating layer 19, the insulating layers 20*a* to 20*l*, the insulating layers constituting the top cover layer 17, and the insulating layers constituting the bottom cover layer 18 may be formed of a same insulating material or different insulating materials from each other. Ferrite material, particles of soft magnetic metal or soft magnetic alloy, a composite material in which a large number of filler particles made of magnetic material are dispersed in resin, or any known magnetic material other than these may be used as a magnetic material for the insulating layer 19, the insulating layers 20*a* to 20*l*, the insulating layers constituting the top cover layer 17, and the insulating layers constituting the bottom cover layer 18. An insulating film made of an insulating material having an excellent insulation property is formed on each of the particles of the soft magnetic metal or soft magnetic alloy.

Ferrite material such as Ni—Zn based ferrite, Ni—Zn—Cu based ferrite, Mn—Zn based ferrite, or any other ferrites may be used as the material for forming the insulating layer 19, the insulating layers 20*a* to 20*l*, the insulating layers constituting the top cover layer 17, and the insulating layers constituting the bottom cover layer 18.

The soft magnetic metal used as the material for the insulating layer 19, the insulating layers 20*a* to 20*l*, the insulating layers constituting the upper cover layer 17, and insulating layers constituting the bottom cover layer 18 may be selected from one or more soft magnetic metals of the group consisting of Fe, Ni, and Co or any other soft magnetic metal.

Soft magnetic alloy such as Fe—Si based alloy, Fe—Ni based alloy, Fe—Co based alloy, Fe—Cr—Si based alloy, Fe—Si—Al based alloy, and Fe—Si—B—Cr based alloy, or any other soft magnetic alloy may be used as the material for forming the insulating layer 19, the insulating layers 20*a* to 20*l*, the insulating layers constituting the top cover layer 17, and the insulating layers constituting the bottom cover layer 18.

When the insulating layer 19, the insulating layers 20*a* to 20*l*, the insulating layers constituting the top cover layer 17, and the insulating layers constituting the bottom cover layer 18 are formed of a composite material in which a large number of filler particles are dispersed in resin, examples of such a resin may include an epoxy resin, a polyimide resin, a polystyrene (PS) resin, a high-density polyethylene (HDPE) resin, a polyoxymethylene (POM) resin, a polycarbonate (PC) resin, a polyvinylidene fluoride (PVDF) resin, a phenolic resin, a polytetrafluoroethylene (PTFE) resin, or a polybenzoxazole (PBO) resin. As the filler particles, particles of ferrite material, metal magnetic particles, or any other known filler particles can be used. Particles of a ferrite material applicable to the present invention are, for example, particles of Ni—Zn ferrite or particles of Ni—Zn—Cu ferrite. Metal magnetic particles applicable to the present invention may include particles of, for example, (1) Fe or Ni; (2) Fe—Si—Cr based alloy, Fe—Si—Al based alloy, or Fe—Ni alloy; (3) Fe—Si—Cr—B—C amorphous alloy, or Fe—Si—B—Cr amorphous alloy; or (4) a material of any combination thereof.

The insulating layer 19, the insulating layers 20*a* to 20*l*, the insulating layers constituting the top cover layer 17, and the insulating layers constituting the bottom cover layer 18 may be entirely formed of the ferrite material, the soft magnetic metal material or the soft magnetic alloy material, or the composite material in which a large number of filler particles are dispersed in resin.

As will be described later, the insulator body 10 has a first portion that has a higher electrical resistivity than other portions. Part or all of the first portion is made of a magnetic material or a non-magnetic material. As the magnetic material for the first portion, a mixed magnetic material in which powder of various glasses such as quartz glass, alumina powder, zirconia powder, and any other oxides powder having a high insulation property is added in the above mentioned magnetic material may be used in order to enhance the insulation property. As the non-magnetic material for the first portion, a mixed material in which powder of various glasses such as quartz glass, alumina powder, zirconia powder, and any other oxides powder excellent in insulation is added may be used in order to enhance the insulation property.

On the upper surfaces of the insulating layers 20*a* to 20*l*, there are provided conductive patterns 31*a* to 31*l*, respectively. The conductive patterns 31*a* to 31*l* are formed by, for example, printing a conductive paste made of a metal or alloy having an excellent electrical conductivity by screen printing. The conductive paste may be made of Ag, Pd, Cu, Al, or an alloy thereof. The conductive patterns 31*a* to 31*l* may be formed by other methods using other materials.

The conductive patterns 31*a* to 31*l* extend around and in the circumferential direction of the coil axis CL. Each of the conductive patterns 31*a* to 31*l* has a partially cut shape. Therefore, each of the conductive patterns 31*a* to 31*l* has a pair of end portions. Each of the conductive patterns 31*a* to 31*l* has, for example, a C-shape or a U-shape in a planar view.

The conductive pattern 31*a* has a circumferential portion 31*a*1 extending in the circumferential direction, and a lead 31*a*2 extending in a radial direction from one end of the circumferential portion 31*a*1 to the second end surface 10*d* of the insulator body 10. The conductive pattern 31*a* is electrically connected to the external electrode 22 through the lead 31*a*2. The conductive pattern 31*i* has a circumferential portion 31*i*1 extending in the circumferential direction, and a lead 31*i*2 extending in the radial direction from one end of the circumferential portion 31*i*1 to the first end surface 10*c* of the insulator body 10. The conductive pattern 31*i* is electrically connected to the external electrode 21 through the lead 31*i*2.

The conductive pattern 31*d* has a circumferential portion 31*d*1 extending in the circumferential direction, and a lead 31*d*2 extending in the radial direction from one end of the circumferential portion 31*d*1 to the second end surface 10*d* of the insulator body 10. The conductive pattern 31*d* is electrically connected to the external electrode 24 through the lead 31*d*2. The conductive pattern 31*i* has a circumferential portion 31*l*1 extending in the circumferential direction, and a lead 31*l*2 extending in the radial direction from one end of the circumferential portion 31*l*1 to the first end surface 10*c* of the insulator body 10. The conductive pattern 31*l* is electrically connected to the external electrode 23 through the lead 31*l*2.

At predetermined positions in the insulating layers 20*a* to 20*h*, connection via conductive members 32*a* to 32*e* are formed. The connection via conductive members 32*a* to 32*e* are formed by forming through-holes at predetermined positions in the insulating layers 20*a* to 20*h* so as to extend in the direction of the axis T and filling the through-holes with a conductive paste.

As described above, one of the end portions of the conductive pattern 31*a* is connected to the external electrode 22. The connection via conductive member 32*a* electrically connects between the end portion of the conductive pattern 31*a* opposite to the end portion thereof connected to the external electrode 22 and one of the end portions of the conductive pattern 31*b*.

The connection via conductive member 32*b* electrically connects between the other of the end portions of the conductive pattern 31*b* and one of the end portions of the conductive pattern 31*c*. The connection via conductive member 32*c* electrically connects between the other of the end portions of the conductive pattern 31*c* and one of the end portions of the conductive pattern 31*e*. The connection via conductive member 32*d* electrically connects between the other of the end portions of the conductive pattern 31*e* and one of the end portions of the conductive pattern 31*g*.

As described above, one of the end portions of the conductive pattern 31*i* is connected to the external electrode 21. The connection via conductive member 32*e* electrically connects between the other of the end portions of the conductive pattern 31*g* and the end portion of the conductive pattern 31*i* opposite to the end portion thereof connected to the external electrode 21.

At predetermined positions in the insulating layers 20*d* to 20*k*, there are formed connection via conductive members 33*a* to 33*e*. The connection via conductive members 33*a* to 33*e* are formed by drilling through-holes at predetermined positions in the insulating layers 20*d* to 20*k* so as to extend in the T-axis direction and embedding a conductive paste into the through-holes.

As described above, one of the end portions of the conductive pattern 31*d* is connected to the external electrode 24. The connection via conductive member 33*a* electrically connects between the end portion of the conductive pattern 31*d* opposite to the end portion thereof connected to the external electrode 24 and one of the end portions of the conductive pattern 31*f*.

The connection via conductive member 33*b* electrically connects between the other of the end portions of the conductive pattern 31*f* and one of the end portions of the conductive pattern 31*h*. The connection via conductive member 33*c* electrically connects between the other of the end portions of the conductive pattern 31*h* and one of the end portions of the conductive pattern 31*j*. The connection via conductive member 33*d* electrically connects between the other of the end portions of the conductive pattern 31*j* and one of the end portions of the conductive pattern 31*k*.

As described above, one of the end portions of the conductive pattern 31*l* is connected to the external electrode 23. The connection via conductive member 33*e* electrically connects between the other of the end portions of the conductive pattern 31*k* and the end portion of the conductive pattern 31*l* opposite to the end portion thereof connected to the external electrode 23.

As described above, between the external electrode 22 and the external electrode 21, there is provided a first coil unit including the conductive pattern 31*a*, the connection via conductive member 32*a*, the conductive pattern 31*b*, the connection via conductive member 32*b*, the conductive pattern 31*c*, the connection via conductive member 32*c*, the conductive pattern 31*e*, the connection via conductive member 32*d*, the conductive pattern 31*g*, the connection via conductive member 32*e*, and the conductive pattern 31*i*.

The insulating layers included in the first coil unit may be herein collectively referred to as the first insulating layers. For example, in the embodiment shown in FIG. 2, the first insulating layers include the insulating layers 20*a*, 20*b*, 20*c*, 20*e*, 20*g*, 20*i*.

The conductive patterns included in the first coil unit may be herein collectively referred to as the first conductive patterns. For example, in the embodiment shown in FIG. 2, the first conductive patterns include the conductive patterns 31*a*, 31*b*, 31*c*, 31*e*, 31*g*, 31*i*. Among the plurality of first conductive patterns, the conductive pattern 31*i* disposed closest to the external electrode 21 may be herein referred to as a first edge conductive pattern, and the conductive pattern 31*a* disposed closest to the external electrode 22 may be herein referred to as a second edge conductive pattern. That is, in the electrical path connecting the external electrode 21 and the external electrode 22, the conductive pattern 31*i* is arranged closest to the external electrode 21 and the conductive pattern 31*a* is disposed closest to the external electrode 22 among the first conductive patterns constituting the first coil unit.

Between the external electrode 24 and the external electrode 23, there is provided a second coil unit including the conductive pattern 31*d*, the connection via conductive member 33*a*, the conductive pattern 31*f*, the connection via conductive member 33*b*, the conductive pattern 31*h*, the connection via conductive member 33*c*, the conductive pattern 31*j*, the connection via conductive member 33*d*, the conductive pattern 31*k*, the connection via conductive member 33*e*, and the conductive pattern 31*l*.

The insulating layers included in the second coil unit may be herein collectively referred to as the second insulating layers. For example, in the embodiment shown in FIG. 2, the second insulating layers include the insulating layers 20*d*, 20*f*, 20*h*, 20*j*, 20*k*, 20*l*.

The conductive patterns included in the second coil unit may be herein referred to as the second conductive patterns. For example, in the embodiment shown in FIG. 2, the second conductive patterns include the conductive patterns 31*d*, 31*f*, 31*h*, 31*j*, 31*k*, 31*l*. Among the plurality of third conductive patterns, the conductive pattern 31*l* disposed closest to the external electrode 23 may be herein referred to as a third edge conductive pattern, and the conductive pattern 31*d* disposed closest to the external electrode 24 may be herein referred to as a fourth edge conductive pattern.

In one embodiment of the invention, each of the insulating layers 20*a* to 20*l* is formed in a plate shape as shown in FIGS. 3*a* and 3*b*. The insulating layer 20*a* may be configured to have an uniform insulation property at any position in the WL plane. In other words, the insulating layer 20*a* may be configured to have a substantially uniform electrical resistivity. For example, the electrical resistivity at five different points in the insulating layer 20*a* may be measured, and an arithmetic average "ρavg" of the measured values at the five points may be determined. When a ratio of a difference "ρΔ" between the maximum value and the minimum value among the five measured values to the arithmetic average ρavg ($100 \cdot \rho\Delta/\rho avg$) is sufficiently small, it can be said that the insulating layer 20*a* has a substantially uniform electrical resistivity. For example, when $100 \cdot \rho\Delta/\rho avg$ is equal to or smaller than 20%, 15%, 10%, or 5%, it can be said that the electrical resistivity of the insulating layer 20*a* is substantially uniform. In the illustrated embodiment, the insulating layers 20*b*, 20*e*, 20*f*, 20*g*, 20*j*, 20*k*, and 20*l* may be configured similarly to the insulating layer 20*a*. That is, each of the insulating layers 20*b*, 20*e*, 20*f*, 20*g*, 20*j*, 20*k*, and 20*l* may be configured such that it has a substantially uniform electrical resistivity.

In one embodiment, the insulating layer 20*c* includes an insulating layer main body 20*c*1 and an annular portion 41*a* that is embedded in the insulating layer main body 20*c*1 and has an annular shape in plan view, as shown in FIG. 3*b*. The annular portion 41*a* may be provided such that its upper surface and lower surface are flush with the upper surface and the lower surface of the insulating layer main body 20*c*1, respectively. In one embodiment, the annular portion 41*a* may be formed in a shape that corresponds to the circumferential portion 31*d*1 of the conductive pattern 31*d* provided on the lower surface of the insulating layer 20*c* in plan view. The annular portion 41*a* may be configured to cover the circumferential portion 31*d*1 of the conductive pattern 31*d* provided on the lower surface of the insulating layer 20*c* in plan view. In this case, the annular portion 41*a* may be provided such that an outer edge 41*a*1 thereof is located outward in the radial direction with respect to the coil axis than an outer edge of the conductive pattern 31*d*. The annular portion 41*a* may be configured to cover both the circumferential portion 31*d*1 of the conductive pattern 31*d* and the lead 31*d*2 provided on the lower surface of the insulating layer 20*c* in plan view. The annular portion 41*a* may be penetrated in the thickness direction by lead via conductive members 35 to 38 and the connection via conductive members 32*a* to 32*e* and 33*a* to 33*e*. which will be described later.

The annular portion 41*a* is configured to have a higher electrical resistivity than the insulating layer main body 20*c*1. For example, in a case where the insulating layer main body 20c1 is formed of a composite material in which filler particles made of an Fe—Si based alloy is mixed in resin, the annular portion 41a may be made of a high insulation material in which an oxide powder having a high insulation property is added in the composite material used for the insulating layer main body 20c1. Thus, it is possible to make the electrical resistivity of the annular portion 41a higher than the insulating layer main body 20c1 by forming the annular portion 41a from a mixed magnetic material containing an additive with a high insulation property (for example, the above-mentioned glass powder, alumina powder, and/or zirconia powder). In another embodiment, it is possible to make the insulation resistivity of the annular portion 41a higher than the insulating layer main body 20c1 by including more voids in the annular portion 41a than the insulating layer main body 20c1. A method for increasing the electrical resistivity of the annular portion 41a relative to the insulating layer main body 20c1 is not limited to the method specifically described herein. Any known method may be used to fabricate the annular portion 41a having a higher insulation resistivity than the insulating layer main body 20c1.

Similar to the insulating layer 20c, the insulating layer 20d has an annular portion 41b, the insulating layer 20h has an annular portion 42a, and the insulating layer 20i has an annular portion 42b. The annular portions 41b, 42a, and 42b may be formed in a shape that corresponds to the annular portion 41a in plan view.

The annular portion 41b may be configured to have a shape that corresponds with at least one of the conductive pattern 31d provided on the upper surface of the insulating layer 20d and the conductive pattern 31e provided on the lower surface of the insulating layer 20d in plan view. The annular portion 41b may have a shape with an outer edge that is slightly larger than the outer edge of the shape of at least one of the conductive pattern 31d and the conductive pattern 31e in plan view.

The annular portion 42a may be configured to have a shape that corresponds with at least one of the conductive pattern 31h provided on the upper surface of the insulating layer 20h and the conductive pattern 31i provided on the lower surface of the insulating layer 20h in plan view. The annular portion 42a may have a shape with an outer edge that is slightly larger than the outer edge of the shape of at least one of the conductive pattern 31h and the conductive pattern 31i in plan view.

The annular portion 42b may be configured to have a shape that corresponds with the conductive pattern 31j provided on the lower surface of the insulating layer 20i (or the upper surface of the insulating layer 20j) in plan view. The annular portion 42b may have a shape with an outer edge that is slightly larger than the outer edge of the shape of the conductive pattern 31j in plan view.

The annular portion 41b of the insulating layer 20d is configured to have a higher electrical resistivity than the insulating layer main body of the insulating layer 20d, which is a portion other than the annular portion 41b in the insulating layer 20d. Similarly, the annular portion 42a of the insulating layer 20h is configured to have a higher electrical resistivity than the insulating layer main body of the insulating layer 20h, which is a portion other than the annular portion 42a. The annular portion 42b is configured to have a higher electrical resistivity than the insulating layer main body of the insulating layer 20i, which is a portion other than the annular portion 42b. The annular portions 41b, 42a, and 42b may be made using the same method as the annular portion 41a.

As described above, in the insulating layer 20c, the annular portion 41a has a higher electrical resistivity than the insulating layer main body 20c1 situated therearound. Similarly, the annular portions 41b, 42a and 42b in the insulating layers 20d, 20h and 20i respectively have higher electrical resistivity than the corresponding insulating layer main bodies situated around the annular portions. In the insulating main body 10 according to one embodiment, the annular portions 41a, 41b, 42a, 42b have electric resistivities higher than those of insulating layers 20a, 20b, 20e, 20f, 20g, 20j, 20k other than the insulating layers 20c, 20d, 20h, 20i, the insulating layers 19, the insulating layers constituting the top cover layer 17, and the insulating layers constituting the bottom cover layer 18.

Thus, the insulator body 10 is configured to include the first portion having an insulation resistivity higher than its peripheral area and the second portion that is the area other than the first portion. In the embodiment shown in FIG. 2, the annular portions 41a, 41b, 42a, 42b correspond to the first portion, and the other portion of the insulator body 10 (the insulating layer main body of the insulating layers 20c, 20d, 20h, 20i, the insulating layers 20c, 20d, 20h, 20i other than the insulating layers 20a, 20b, 20e, 20f, 20g, 20j, 20k, 20l, the insulating layer 19, the insulating layers constituting the top cover layer 17, and the insulating layers constituting the bottom cover layer 18) correspond to the second portion.

Figure 4:
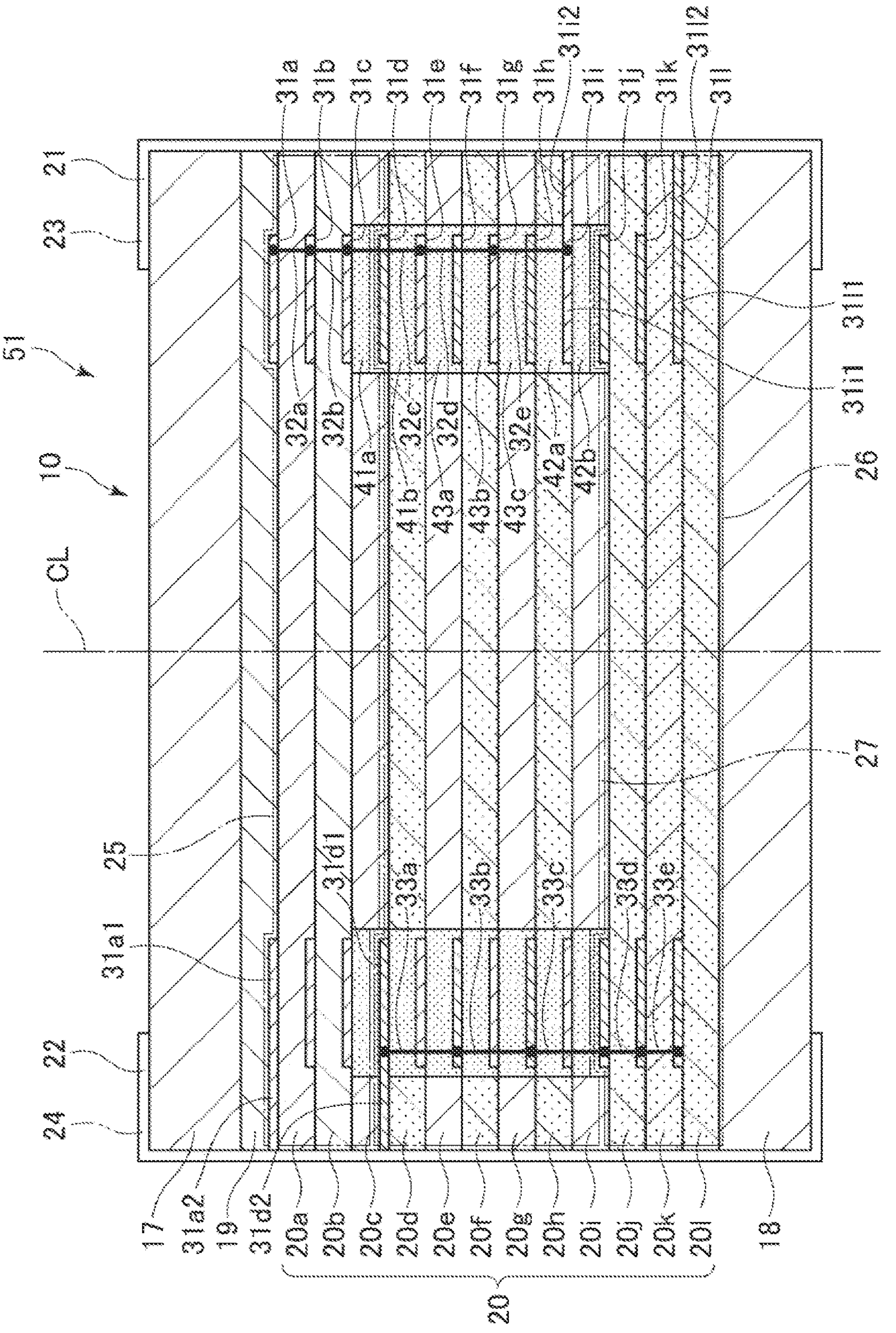
FIG. 4 is a schematic perspective view of a coil element according to another embodiment of the invention as viewed from the front.

The annular portions 41a, 41b, 42a, 42b shown in FIG. 2 are examples of the first portion in the insulator body 10. The shape and arrangement of the first portion is not limited to the embodiment shown in FIG. 2. For example, some or all of the insulating layer 20a, 20b, 20e, 20f, 20g, 20j, 20k, and 20l may each have a high insulation portion corresponding to the annular portion 41a in another embodiment. FIG. 4 is a schematic perspective view of a coil element 51 according to another embodiment of the invention as viewed from the front. In the coil element 51 shown in FIG. 4, in addition to the annular portions 41a, 41b, 42a, 42b provided in the insulating layers 20c, 20d, 20h, 20i, annular portion 43a, 43b, 43c are provided in the insulating layers 20e, 20f, 20g respectively. Each of the annular portions 43a, 43b, 43c may be formed in the same shape and from the same material as the annular portion 41a. Therefore, in the coil component 51, the annular portions 43a, 43b, and 43c also serve as the first portion in addition to the annular portions 41a, 41b, 42a, 42b. In the embodiment shown in FIG. 4, the annular portions 41a, 41b, 42a, 42b, 43a, 43b, and 43c have the same shape in plan view. Alternatively to the embodiment shown in FIG. 4, the shape and arrangement of the first portion may be changed as appropriate without departing from the spirit of the present invention.

Measurement of the electrical resistivity of each insulating layer can be performed by a known method. For example, to measure an electrical resistivity of the insulating layer 20a, a sheet resistance of the insulating layer 20a is measured using a sheet resistance measuring instrument, and the thickness of the insulating layer 20a is measured by a microprobe. The electrical resistivity is calculates based on the measured sheet resistance and thickness of insulating layer 20a. The electrical resistivity of each annular portion can also be calculated based on the measured sheet resistance and thickness of the annular portion.

The insulator portion 20 is divided into a top region 25, a bottom region 26, and an intermediate region 27 interposed between the top region 25 and the bottom region 26.

The top region 25 includes the insulating layers 20*a*, 20*b*, 20*c* and the conductive patterns 31*a*, 31*b*, 31*c*. The top end of the top region 25 is in contact with the lower surface of the insulating layer 19.

The bottom region 26 includes the insulating layers 20*j*, 20*k*, 20*l* and the conductive patterns 31*j*, 31*k*, 31*l*. The bottom end of the bottom region 26 is in contact with the top surface of the bottom cover layer 18.

The intermediate region 27 includes the insulating layers 20*d*, 20*e*, 20*f*, 20*g*, 20*h*, 20*i* and the conductive patterns 31*d*, 31*e*, 31*f*, 31*g*, 31*h*, 31*i*. The top end of the intermediate region 27 is in contact with the bottom end of the top region 25, and the bottom end of the intermediate region 27 is in contact with the top end of the bottom region 26.

The top region 25 includes only the conductive patterns of the first coil unit (specifically, the conductive patterns 31*a*, 31*b*, 31*c*) among the conductive patterns 31*a* to 31*l* embedded in the insulator body 10. The top region 25 includes only the insulating layers having formed thereon the conductive patterns of the first coil unit (specifically, the insulating layers 20*a*, 20*b*, 20*c*) among the insulating layers 20*a* to 20*l* constituting the insulator portion 20.

The top region 25 includes the conductive patterns 31*a*, 31*b*, 31*c* of the first coil unit but does not include the second conductive patterns of the second coil unit. The potential difference between the conductive patterns of the first coil unit is ordinarily not so large as to cause dielectric breakdown, and therefore, the top region 25 is hardly subject to dielectric breakdown.

The bottom region 26 includes only the conductive patterns of the second coil unit (specifically, the conductive patterns 31*j*, 31*k*, 31*l*) among the conductive patterns 31*a* to 31*l* embedded in the insulator body 10. The bottom region 26 includes only the insulating layers having formed thereon the conductive patterns of the second coil unit (specifically, the insulating layers 20*j*, 20*k*, 20*l*) among the insulating layers 20*a* to 20*l* constituting the insulator portion 20.

The bottom region 26 includes the conductive patterns 31*j*, 31*k*, 31*l* of the second coil unit but does not include the first conductive patterns of the first coil unit. The potential difference between the conductive patterns of the second coil unit is ordinarily not so large as to cause dielectric breakdown, and therefore, the bottom region 26 is hardly subject to dielectric breakdown.

The intermediate region 27 includes the insulating layers having formed thereon the conductive patterns of the first coil unit and the insulating layers having formed thereon the conductive patterns of the second coil unit, among the conductive patterns 31*a* to 31*l* embedded in the insulator body 10, and these insulating layers are arranged alternately in the stacking direction (the direction parallel to the coil axis CL). In the embodiment shown in FIG. 2, the intermediate region 27 includes the insulating layer 20*d* having formed thereon the conductive pattern 31*d*, the insulating layer 20*e* having formed thereon the conductive pattern 31*e*, the insulating layer 20*f* having formed thereon the conductive pattern 31*f*, the insulating layer 20*g* having formed thereon the conductive pattern 31*g*, the insulating layer 20*h* having formed thereon the conductive pattern 31*h*, and the insulating layer 20*i* having formed thereon the conductive pattern 31*i*, and these insulating layers are arranged in this order from the top to the bottom with respect to the stacking direction of the intermediate region 27. In this arrangement, the conductive patterns 31*d*, 31*f*, 31*h* are included in the first coil unit, and the conductive patterns 31*e*, 31*g*, 31*i* are included in the second coil unit. Among the first conductive patterns, those provided in the intermediate region 27 may be herein referred to as intermediate first conductive patterns. In the example shown in FIG. 2, among the conductive patterns 31*a*, 31*b*, 31*c*, 31*e*, 31*g*, and 31*i* included in the first conductive patterns, the conductive patterns 31*e*, 31*g*, and 31*i* are situated in the intermediate region 27. Thus, the conductive patterns 31*e*, 31*g*, and 31*i* are examples of the intermediate first conductive patterns. Similarly, among the second conductive patterns, ones provided in the intermediate region 27 may be referred to as an intermediate second conductive patterns. Among the conductive patterns 31*d*, 31*f*, 31*h*, 31*j*, 31*k*, and 31*l* included in the second conductive patterns, the conductive patterns 31*d*, 31*f*, and 31*h* are situated in the intermediate region 27. Thus, the conductive patterns 31*d*, 31*f*, and 31*h* are examples of the intermediate second conductive patterns.

As described above, the intermediate region 27 includes the insulating layers 20*d*, 20*f*, 20*h* having formed thereon the conductive patterns 31*d*, 31*f*, 31*h* of the first coil unit, respectively, and the insulating layers 20*e*, 20*g*, 20*i* having formed thereon the conductive patterns 31*e*, 31*g*, 31*i* of the second coil unit, respectively, and these insulating layers are arranged alternately in the stacking direction. Thus, in the intermediate region 27, the first conductive patters and the second conductive patterns are disposed on adjacent insulating layers, thereby increasing the coupling coefficient between the first coil unit and the second coil unit.

One end portion of the first coil unit (the end portion of the conductive pattern 31*a*) is connected to the external electrode 22, and the other end portion of the first coil unit (the end portion of the conductive pattern 31*i*) is connected to the external electrode 21. Thus, in the embodiment shown, one end portion of the first coil unit is disposed in the top region 25, and the other end portion of the first coil unit is disposed in the intermediate region 27.

One end portion of the second coil unit (the end portion of the conductive pattern 31*d*) is connected to the external electrode 24, and the other end portion of the second coil unit (the end portion of the conductive pattern 31*l*) is connected to the external electrode 23. Thus, in the embodiment shown, one end portion of the second coil unit is disposed in the intermediate region 27, and the other end portion of the second coil unit is disposed in the bottom region 26.

In one embodiment of the present invention, the coil element 1 is mounted on an electronic circuit (not shown) such that an electric current flows from the external electrode 22 through the first coil unit to the external electrode 21 and an electric current flows from the external electrode 23 through the second coil unit to the external electrode 24. The electric potential of the voltage supplied from the external electrode 22 to the end portion of the coil unit disposed in the top region 25 (the end portion of the conductive pattern 31*a*) is equal to the electric potential of the voltage supplied from the external electrode 23 to the end portion of the second coil unit disposed in the bottom region 26 (the end portion of the conductive pattern 31*l*). Thus, in one embodiment of the present invention, the first coil unit and the second coil unit are configured and arranged such that the electric potential of the voltage supplied from the external electrode 22 to one end portion of the first coil unit is equal to the electric potential of the voltage supplied from the external electrode 23 to one end portion of the second coil unit.

The electric potential of the coil unit in the intermediate region 27 is lower than the electric potential of the voltage supplied from the external electrode 22 due to a voltage drop in the conductive patterns of the first coil unit disposed in the top region 25 (the conductive patterns 31*a*, 31*b*, 31*c*). Similarly, the electric potential of the second coil unit in the intermediate region 27 is lower than the electric potential of the voltage supplied from the external electrode 23 due to a voltage drop in the conductive patterns of the second coil unit disposed in the bottom region 26 (the conductive patterns 31*j*, 31*k*, 31*l*). Therefore, in the above embodiment, the potential difference between the first coil unit and the second coil unit is small in the intermediate region 27. Thus, in the intermediate region 27, insulation between the first coil unit and the second coil unit can be readily ensured.

As described above, the insulator body 10 is configured to include the first portion having a high electrical resistivity and the second portion having an electrical resistivity lower than the first portion. In one embodiment, the first portion is provided in the insulator body 10 such that it covers upper and lower surfaces of at least one of the one or more intermediate first conductive patterns. In one embodiment, the first portion is provided in the insulator body 10 to further cover upper and lower surfaces of at least one of the one or more intermediate second conductive patterns. For example, in the embodiment shown in FIG. 2, the annular portions 41*a*, 41*b*, 42*a*, 42*b* correspond to the first portion. Among them, the annular portion 42*a* covers an upper surface of the conductive pattern 31*i*. which is one of the intermediate first conductive patterns, and the annular portion 42*b* covers a lower surface of the conductive pattern 31*i*. Further, the annular portion 41*a* covers an upper surface of the conductive pattern 31*d*, which is one of the intermediate second conductive patterns, and the annular portion 41*b* covers a lower surface of the conductive pattern 31*d*. Thus, in the embodiment shown in FIG. 4, the upper and lower surfaces of the conductive pattern 31*i*, which is one of the intermediate first conductive patterns, are covered by the annular portion 42*a* and the annular portion 42*b* that are part of the first portion. The upper and lower surfaces of the conductive pattern 31*d*, which is one of the intermediate second conductive patterns, are covered by the annular portion 41*a* and the annular portion 41*b* that are part of the first portion. In the intermediate region 27, since the conductive patterns included in the first coil unit and the conductive patterns included in the second coil unit are alternately stacked, a potential difference between adjacent conductive patterns in the intermediate region 27 may be larger than a potential difference between adjacent conductive patterns in the upper end region 25 and the lower end region 26. In the above embodiment, the upper and lower surfaces of at least one of the conductive patterns (the intermediate first conductive pattern and/or the intermediate second conductive pattern) provided in the intermediate region 27 are covered by the first portion that has a high electrical resistivity. Therefore it is possible to improve the insulation reliability in the intermediate region 27.

The conductive pattern 31*i* is the first edge conductive pattern disposed closest to the external electrode 21 among the first conductive patterns, so that the first portion is provided such that they cover the upper and lower surfaces of the first edge conductive pattern. According to the above-described embodiment, the upper and lower surfaces of the first edge conductive pattern having a high electric potential as they are disposed closest to the external electrode 21 in the first coil unit are covered by the first portion. Therefore it is possible to improve the insulation reliability of the area around the first edge conductive pattern in the insulator body 10. The conductive pattern 31*a*, which is the second edge conductive pattern, is provided in the upper end region 25 so that the conductive pattern 31*b* is situated adjacent to the conductive pattern 31*a* of the same line (that is, of the first coil unit). Since dielectric breakdown hardly occurs between conductive patterns in the same line, the first portion may not necessarily cover the upper and lower surfaces of the second edge conductive pattern. It is desirable to reduce the proportion of the first portion in the insulator main body 10 because the first portion may reduce the magnetic permeability while contributing to the improvement of the insulation reliability. By providing the first portion such that it covers the upper and lower surfaces of the first edge conductive pattern while it does not cover the upper and lower surfaces of the second edge conductive pattern, it is possible to improve the insulation reliability and prevent deterioration of the Q value.

The conductive pattern 31*d* is the fourth edge conductive pattern disposed closest to the external electrode 24 among the second conductive patterns, so that the first portion is provided such that it covers the upper and lower surfaces of the fourth edge conductive pattern. According to the above-described embodiment, the upper and lower surfaces of the fourth edge conductive pattern having a high electric potential as they are disposed closest to the external electrode 21 in the second coil unit are covered by the first portion. Therefore it is possible to improve the insulation reliability of the area around the fourth edge conductive pattern in the insulator body 10. The conductive pattern 31*l*, which is the third edge conductive pattern, is provided in the lower end region 26 so that the conductive pattern 31*k* is situated adjacent to the conductive pattern 31*l* of the same line (that is, of the second coil unit). Since dielectric breakdown hardly occurs between conductive patterns of the same line, the first portion may not necessarily cover the upper and lower surfaces of the third edge conductive pattern. By providing the first portion such that it covers the upper and lower surfaces of the fourth edge conductive pattern while it does not cover the upper and lower surfaces of the third edge conductive pattern, it is possible to improve the insulation reliability and prevent deterioration of the magnetic permeability.

The shape and arrangement of the first portion can be changed as appropriate. In the embodiment shown in FIG. 4, the annular portions 43*a*, 43*b* and 43*c* are provided in the insulating layers 20*e*, 20*f* and 20*g*, respectively. The annular portions 43*a*, 43*b*, and 43*c* are configured in the same manner as the annular portion 41*a*, and thus are part of the first portion. Therefore, in the embodiment of FIG. 4, the upper and lower surfaces of each of the intermediate first conductive patterns 31*e*, 31*g*, 31*i* and the intermediate second conductive patterns 31*d*, 31*f*, 31*h* included in the intermediate region 27 are covered by the first portion. Thereby, the insulation reliability of the insulator body 10 can be further improved.

In the coil element 1, the number of the conductive patterns and the insulating layers stacked in the intermediate region 27 can be increased to further increase the coupling coefficient. According to the above embodiment, since insulation between the conductive patterns of different lines is improved, dielectric breakdown is unlikely to occur even if the space between the conductive patterns of the different lines is narrowed. Thereby, it is easy to increase the number of layers of conductive patterns contributing to the coupling in the above embodiment.

Next, a description is given of an example of a production method of the coil component 1. The coil component 1 can be produced by, for example, a lamination process. More specifically, the first step is to produce the insulating layer 19, the insulating layers 20*a* to 20*l*, the insulating layers constituting the top cover layer 17, and the insulating layers constituting the bottom cover layer 18.

More specifically, to fabricate these insulating layers, a thermosetting resin (e.g., epoxy resin) having filler particles dispersed therein is mixed with a solvent to produce a slurry. The slurry is applied to a surface of a base film made of a plastic and dried, and the dried slurry is cut to a predetermined size to obtain magnetic sheets to be used as the insulating layer 19, the insulating layers 20*a*, 20*b*, 20*e*, 20*f*, 20*g*, 20*j*, 20*k*, and 20*l*, the insulating layers constituting the top cover layer 17, and the insulating layers constituting the bottom cover layer 18.

Next, a ring-shaped sheet to be used as the annular portions 41*a*, 41*b*, 42*a*, 42*b* is formed. The ring-shaped sheets, that are going to be the annular portions 41*a*, 41*b*, 42*a*, 42*b*, are obtained by adding an oxide (glass powder, alumina powder, zirconia powder, or a mixture thereof) excellent in insulation to the slurry used for fabrication of the magnetic sheet described above, applying the slurry in which the oxide is added to a surface of a plastic base film, drying the slurry, and cutting the dried slurry into a ring shape. By printing a resin that contains filler particles around the ring-shaped sheets, magnetic sheets that serve as the insulating layers 20*c*, 20*d*, 20*h* and 20*i* can be obtained.

Next, through-holes are formed at predetermined positions in the magnetic sheets to be used as the insulating layers 20*a* to 20*k* so as to extend through the magnetic sheets in the T-axis direction.

Next, a conductive paste made of a metal material (e.g. Ag) is printed by screen printing on the top surfaces of the magnetic sheets to be used as the insulating layers 20*a* to 20*l*, so as to form the conductive patterns 31*a* to 31*l*, and the metal paste is buried into the through-holes formed in the magnetic sheets to form the connection via conductive members 32*a* to 32*e* and the connection via conductive members 33*a* to 33*e*.

Next, the magnetic sheets to be used as the insulating layers 20*a* to 20*l* are stacked together to obtain a coil laminate to be used as the insulator portion 20. Next, the magnetic sheets for the top cover layer 17 are stacked together to from a top cover layer laminate that corresponds to the top cover layer 17, and the magnetic sheets for the bottom cover layer 18 are stacked together to from a bottom cover layer laminate that corresponds to the bottom cover layer 18.

Next, the bottom cover layer laminate to be used as the bottom cover layer 18, the coil laminate to be used as the insulator portion 20, the magnetic sheet to be used as the insulating layer 19, and the top cover layer laminate to be used as the top cover layer 17 are stacked together and bonded together by thermal compression using a pressing machine to obtain a body laminate.

Next, the body laminate is segmented into units of a desired size by using a cutter such as a dicing machine and a laser processing machine to obtain a chip laminate corresponding to the insulator body 10. Next, the chip laminate is subjected to degreasing, and the chip laminate thus degreased is heat-treated.

Next, a conductive paste is applied to both end portions of the heated chip laminate to form the external electrode 21, the external electrode 22, the external electrode 23, and the external electrode 24. Thus, the coil component 1 is obtained.

Figure 5:
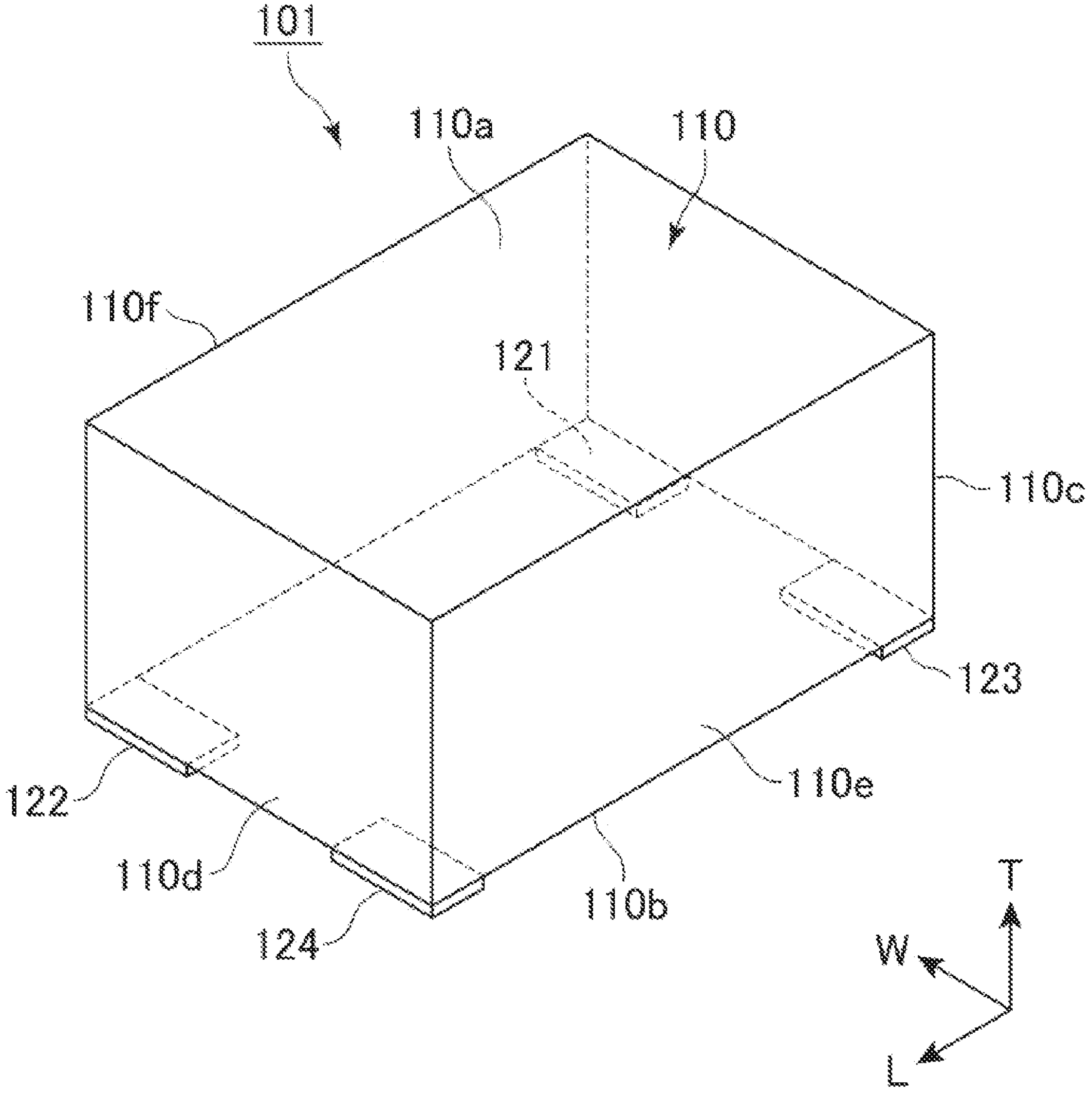
FIG. 5 is a perspective view of a coil element according to another embodiment of the invention.
Figure 6:
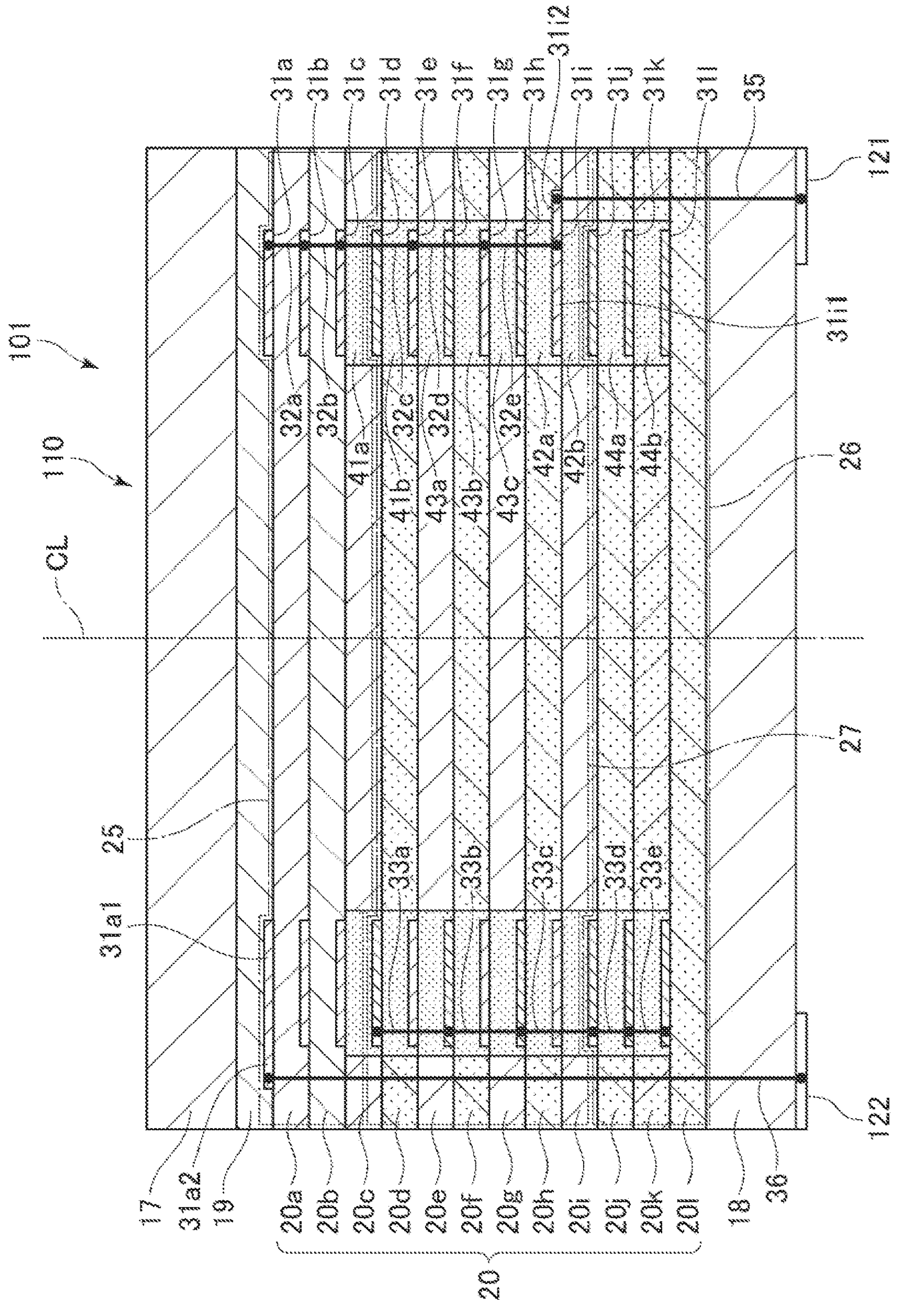
FIG. 6 is a schematic perspective view of the interior of the coil element of FIG. 5 as viewed from the front.
Figure 7:
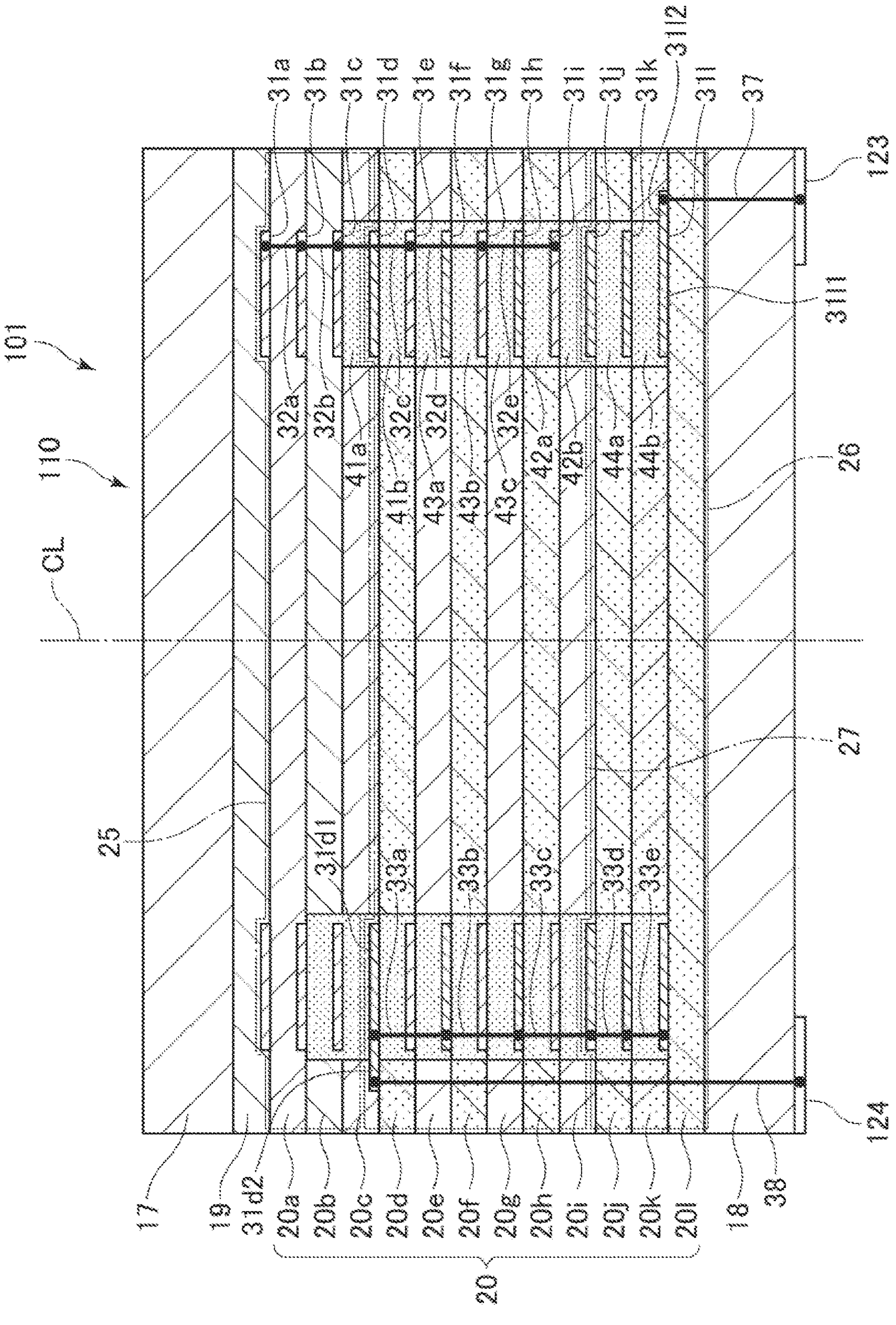
FIG. 7 is a schematic perspective view of the interior of the coil element of FIG. 5 as viewed from the front.

Next, with reference to FIGS. 5 to 7, a description is given of a coil component 101 according to another embodiment of the invention. The coil element 101 shown in FIG. 7 includes external electrodes 121 to 124 in place of the external electrodes 21 to 24 of the coil element 1. The shapes of the conductive patterns 31*a*, 31*d*, 31*j*, and 31*l* of the coil element 101 are slightly altered from the conductive patterns 31*a*, 31*d*, 31*j*, and 31*l* of the coil element 1 in accordance with the change in the arrangement of the external electrodes. Descriptions of the components of the coil element 101 that are the same as or similar to the components of the coil component 1 will be hereunder omitted.

FIG. 5 is a perspective view of the coil element 101 according to one embodiment of the invention, and FIGS. 6 and 7 are schematic perspective views of the interior of the coil element 101 of FIG. 5 as viewed from the front. FIG. 6 shows lead via conductive members connected to an external electrode 121 and an external electrode 122, and FIG. 7 shows lead via conductive members connected to external electrode 123 and external electrode 124.

As shown, the external electrodes 121 to 124 are provided on the bottom surface 110*b* of the insulator body 110. The bottom surface 110*b* is opposed to the top surface 110*a*. A portion of each of the external electrodes 121 to 124 may be formed to extend along at least one selected from the group consisting of a first end surface 110*c*, a second end surface 110*d*, a first side surface 110*e*, and a second side surface 110*f*. The shapes and the arrangements of the external electrodes 121 to 124 described explicitly in this specification are mere examples. Therefore, the shapes and the arrangements of the external electrodes that are applicable to the present invention are not limited to those explicitly described in this specification.

As shown in FIG. 6, the conductive pattern 31*a* includes the circumferential portion 31*a*1 extending in the circumferential direction, and the lead 31*a*2 extending in a radial direction from one end of the circumferential portion 31*a*1. In the embodiment FIG. 6, the lead 31*a*2 is not exposed from the second end surface 110*d* of the insulator body 110. The conductive pattern 31*i* includes a circumferential portion 31*i*1 extending in the circumferential direction, and a lead 31*i*2 extending in the radial direction from one end of the circumferential portion 31*i*1. The lead 31*i*2 is not exposed from the first end surface 110*c* of the insulator body 110.

At predetermined positions in the insulating layers 20*i* to 20*l* and the bottom cover layer 18, a first through hole penetrating the layers in the T-axis direction is formed. The lead via conductive member 35 is provided in the first through hole so as to electrically connect the lead 31*i*2 of the conductive pattern 31*i* to the external electrode 121. The lead via conductive member 35 is an example of a first lead via conductive member.

At predetermined positions in the insulating layers 20*a* to 20*l* and the bottom cover layer 18, a second through hole penetrating the layers in the T-axis direction is formed. The lead via conductive member 36 is provided in the second through hole so as to electrically connect the lead 31*a*2 of the conductive pattern 31*a* to the external electrode 122. The lead via conductive member 36 is an example of a second lead via conductive member.

Thus, the conductive pattern 31*i* is connected to the external electrode 121 through the lead via conductive member 35, and the conductive pattern 31*a* is connected to the external electrode 122 through the lead via conductive member 36.

As shown in FIG. 7, the conductive pattern 31*d* includes the circumferential portion 31*d*1 extending in the circumferential direction, and the lead 31*d*2 extending in the radial direction from one end of the circumferential portion 31*d*1. In the embodiment FIG. 7, the lead 31*d*2 is not exposed from the second end surface 110*d* of the insulator body 110. The conductive pattern 31*l* includes the circumferential portion 31*l*1 extending in the circumferential direction, and the lead 31*l*2 extending in the radial direction from one end of the circumferential portion 31*l*1. The lead 31*l*2 is not exposed from the first end surface 110*c* of the insulator body 110.

At predetermined positions in the insulating layer 20*l* and the bottom cover layer 18, a third through hole penetrating the layers in the T-axis direction is formed. The lead via conductive member 37 is provided in the third through hole so as to electrically connect the lead 31*l*2 of the conductive pattern 31*l* to the external electrode 123. The lead via conductive member 37 is an example of a third lead via conductive member.

At predetermined positions in the insulating layer 20*d* to 20*l* and the bottom cover layer 18, a fourth through hole penetrating the layers in the T-axis direction is formed. The lead via conductive member 38 is provided in the fourth through hole so as to electrically connect the lead 31*d*2 of the conductive pattern 31*d* to the external electrode 124. The lead via conductive member 38 is an example of a fourth lead via conductive member.

Thus, the conductive pattern 31*d* is connected to the external electrode 124 through the lead via conductive member 38, and the conductive pattern 31*l* is connected to the external electrode 123 through the lead via conductive member 37.

As shown in FIGS. 6 and 7, each of the insulating layers 20*c* to 20*k* is provided with an annular portion having a high electrical resistivity. The annular portions 41*a*, 41*b*, 42*a*, 42*b*, and 43*a* to 43*c* provided in the insulating layers 20*c* to 20*i* are configured in the same manner as the corresponding annular portions included in the coil element 51 shown in FIG. 4. Additionally the insulating layer 20*j* includes an annular portion 44*a*, and the insulating layer 20*k* includes an annular portion 44*b*. The annular portions 44*a* and 44*b* may be configured to have a shape that corresponds the shape of each of the annular portions 41*a*, 41*b*, 42*a*, 42*b*, and 43*a* to 43*c* in plan view.

The annular portion 44*a* of the insulating layer 20*j* is configured to have a higher electrical resistivity than the insulating layer main body of the insulating layer 20*j*, which is the portion other than the annular portion 44*a* of the insulating layer 20*j*. Similarly, the annular portion 44*b* of the insulating layer 20*k* is configured to have a higher electrical resistivity than the insulating layer main body of the insulating layer 20*k*, which is a portion other than the annular portion 44*b* of the insulating layer 20*k*. The annular portions 44*a* and 44*b* may be fabricated in the same manner as the annular portion 41*a*.

In the coil element 101, the annular portions 41*a*, 41*b*, 42*a*, 42*b*, 43*a* to 43*c*, 44*a*, and 44*b* are configured as the first portion. This first portion is not only provided between the conductive patterns, but also between the lead via conductive member 35 and the second conductive pattern (specifically, the conductive patterns 31*j*, 31*k*, and 31*l*), the lead via conductive member 36 and the second conductive pattern (specifically, the conductive patterns 31*d*, 31*f*, 31*h*, 31*j*, 31*k*, and 31*l*), and the lead via conductive member 38 and the plurality of first conductive patterns (specifically, the conductive patterns 31*e*, 31*g*, and 31*i*).

Advantageous effects of the embodiments will be now described. The electric potential at the intermediate region 27 of the first coil unit and the second coil unit is reduced from the potentials at the external electrode 22 and the external electrode 23 through the paths from the external electrode 22 and the external electrode 23 to the intermediate region 27. Therefore, according to the above embodiment, the potential difference between the first coil unit and the second coil unit in the intermediate region 27 can be reduced. Thereby, it is possible to enhance the insulation reliability of the insulator body 10.

In the above embodiment, the upper and lower surfaces of at least one of the conductive patterns (the intermediate first conductive pattern and/or the intermediate second conductive pattern) provided in the intermediate region 27 are covered by the first portion that has a high electrical resistivity. Therefore it is possible to improve the insulation reliability in the intermediate region 27.

In one embodiment, by providing the first portion such that it covers the upper and lower surfaces of the first edge conductive pattern (the conductive pattern 31*i*) in the intermediate region 27 while it does not cover the upper and lower surfaces of the second edge conductive pattern (the conductive pattern 31*a*) in the upper end region 25, it is possible to improve the insulation reliability and prevent deterioration of the magnetic permeability.

In one embodiment, by providing the first portion such that it covers the upper and lower surfaces of the fourth edge conductive pattern (the conductive pattern 31*d*) in the intermediate region 27 while it does not cover the upper and lower surfaces of the third edge conductive pattern (the conductive pattern 31*l*) in the lower end region 27, it is possible to improve the insulation reliability and prevent deterioration of the magnetic permeability.

In one embodiment, the upper and lower surfaces of each of the intermediate first conductive patterns 31*e*, 31*g*, 31*i* and the intermediate second conductive patterns 31*d*, 31*f*, 31*h* included in the intermediate region 27 are covered by the first portion. Therefore it is possible to improve the insulation reliability of the insulator body 10.

In one embodiment, even when the lead via conductive members 35 to 38 are provided to connect the external electrodes 121 to 124 and the conductive patterns respectively, it is possible to increase the insulation reliability between the lead via conductive members 35 to 38 and the corresponding conductive patterns.

The dimensions, materials, and arrangements of the various constituent elements described herein are not limited to those explicitly described in the embodiments, and the various constituent elements can be modified to have any dimensions, materials, and arrangements within the scope of the present invention. Furthermore, constituent elements not explicitly described herein can also be added to the embodiments described, and it is also possible to omit some of the constituent elements described in the embodiments.

What is claimed is:

1. A coil element, comprising:

an insulator body including a plurality of first insulating layers and a plurality of second insulating layers laminated in a stacking direction;

a plurality of first conductive patterns formed on the plurality of first insulating layers;

a plurality of second conductive patterns formed on the plurality of second insulating layers;

a first external electrode provided on a bottom surface of the insulator body;

a second external electrode provided on the bottom surface of the insulator body;

a third external electrode provided on the bottom surface of the insulator body;

a fourth external electrode provided on the bottom surface of the insulator body;

a first lead via conductive member connecting the first external electrode and a first end of a first coil unit including the plurality of first conductive patterns;

a second lead via conductive member connecting the second external electrode and a second end of the first coil unit;

a third lead via conductive member connecting the third external electrode and a first end of a second coil unit including the plurality of second conductive patterns;

a fourth lead via conductive member connecting the fourth external electrode and a second end of the second coil unit;

wherein the insulator body includes a first end region situated at a top in the stacking direction, a second end region situated at a bottom in the stacking direction, and an intermediate region situated between the first end region and the second end region, wherein the first end region includes one or more of the plurality of first insulating layers only, wherein the second end region includes one or more of the plurality of second insulating layers only, wherein the insulator body includes a first portion and a second portion, an electrical resistivity of the first portion being higher than an electrical resistivity of the second portion, the first portion covering upper and lower surfaces of at least one of one or more intermediate first conductive patterns in the intermediate region among the plurality of first conductive patterns, wherein the first lead via conductive member, the second lead via conductive member, and the fourth lead via conductive member are arranged outside the first portion both in the intermediate region and the second end region such that the first lead via conductive member, the second lead via conductive member, and the fourth lead via conductive member each pass through only the second portion of the insulator body both in the intermediate region and the second end region, and wherein the third lead via conductive member is arranged outside the first portion in the second end region such that the third lead via conductive member passes through only the second portion of the insulator body in the second end region.

2. The coil element of claim 1, wherein the first portion is further provided to cover upper and lower surfaces of at least one of one or more intermediate second conductive patterns in the intermediate region among the plurality of second conductive patterns.

3. The coil element of claim 1, further comprising:

wherein the first coil unit includes a first circumferential portion, a second circumferential portion, a first lead and a second lead, the first circumferential portion and the second circumferential portion each extending around a coil axis and being covered by the first portion, the first lead extending radially outwardly from the first circumferential portion, the second lead extending radially outwardly from the second circumferential portion, wherein the first lead via conductive member is connected to the first lead, wherein the second lead via conductive member is connected to the second lead.

4. The coil element of claim 3, further comprising:

wherein the second coil unit includes a third circumferential portion, a fourth circumferential portion, a third lead and a fourth lead, the third circumferential portion and the fourth circumferential portion each extending around the coil axis and being covered by the first portion, the third lead extending radially outwardly from the third circumferential portion, the fourth lead extending radially outwardly from the fourth circumferential portion, wherein the third lead via conductive member is connected to the third lead, wherein the fourth lead via conductive member is connected to the fourth lead.

5. The coil element of claim 4, wherein the first portion is provided to be interposed between the first lead via conductive member and the plurality of second conductive patterns, between the second lead via conductive member and the plurality of second conductive patterns, and between the fourth lead via conductive member and the plurality of first conductive patterns.

6. The coil element of claim 1, further comprising:

one or more first connection via conductive members connecting the plurality of first conductive patterns to each other; and one or more second connection via conductive members connecting the plurality of second conductive patterns to each other.

7. The coil element of claim 1, wherein the intermediate region includes other one or more of the plurality of first insulating layers and other one or more of the plurality of second insulating layers, each of said one or more of the plurality of first insulating layers in the intermediate region being arranged between adjacent two of the plurality of second insulating layers in the stacking direction, each of said one or more of the plurality of second insulating layers in the intermediate region being arranged between adjacent two of the plurality of first insulating layers in the stacking direction.

* * * * *